United States Patent
Maeda et al.

(10) Patent No.: US 7,616,765 B2
(45) Date of Patent: Nov. 10, 2009

(54) METHOD AND SYSTEM FOR GENERATING SHARED INFORMATION

(75) Inventors: Wakako Maeda, Tokyo (JP); Akio Tajima, Tokyo (JP); Akihiro Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 810 days.

(21) Appl. No.: 11/261,669

(22) Filed: Oct. 31, 2005

(65) Prior Publication Data

US 2006/0093143 A1    May 4, 2006

(30) Foreign Application Priority Data

Nov. 1, 2004    (JP)    ............... 2004-317615

(51) Int. Cl.
*H04K 1/00* (2006.01)
*H04L 9/00* (2006.01)

(52) U.S. Cl. ............... 380/255; 380/256; 380/44; 380/46

(58) Field of Classification Search ......... 380/255–256, 380/260–263, 44–46, 269–263; 713/171
See application file for complete search history.

(56) References Cited

U.S. PATENT DOCUMENTS 4,961,221 A * 10/1990 Abiven ............... 713/150
5,063,595 A * 11/1991 Ballance ............... 370/522
5,243,649 A * 9/1993 Franson ............... 380/256
2003/0231771 A1   12/2003 Gisin et al.

FOREIGN PATENT DOCUMENTS

| JP | 2000-174747 | 6/2000 |
| JP | 2004-112278 | 4/2004 |
| WO | WO 01/86855 A2 | 11/2001 |
| WO | WO 03/009513 A2 | 1/2003 |

* cited by examiner

*Primary Examiner*—Hosuk Song
(74) *Attorney, Agent, or Firm*—Young & Thompson

(57) ABSTRACT

A sender sends original random-number data to a receiver through a quantum channel. The receiver generates a raw key from information received through the quantum channel and notifies the received information to the sender. The sender performs received-bit comparison and basis reconciliation based on the received information and provisionally shares a sifted key with the receiver. The receiver sends part of its version of the sifted key to the sender, by which an error rate is calculated. The calculated error rate is compared with a predetermined threshold value for bit position synchronization determination. When the calculated error rate is larger, the sender notifies the receiver that bit position synchronization is not established. The receiver reassigns bit numbers to the sifted key, and received-bit comparison and basis reconciliation are performed again. This procedure is repeated until the calculated error rate becomes smaller than the threshold value.

21 Claims, 11 Drawing Sheets

RECEIVED-BIT NUMBERS & BASIS INFORMATION

| BIT NUMBER | RANDOM NUMBER | BASIS A | PHASE | BASIS B | OUTPUT | BIT NUMBER |
|---|---|---|---|---|---|---|
| 1  | 1  | + | $\pi$    | + | 1      | 1  |
| 2  | -1 | × | $3\pi/2$ | + | *      |    |
| 3  | 0  | × | $\pi/2$  | + | 0 OR 1 | 3  |
| 4  | 1  | × | $3\pi/2$ | × | 1      | 4  |
| 5  | -0 | + | 0        | × | *      |    |
| 6  | -1 | + | $\pi$    | + | *      | 6  |
| 7  | 0  | + | 0        | × | 0 OR 1 | 7  |
| 8  | 0  | + | 0        | + | 0      | 8  |
| 9  | -0 | × | $\pi/2$  | × | *      |    |
| 10 | 1  | × | $3\pi/2$ | × | 1      | 10 |
| 11 | -1 | + | $\pi$    | × | *      |    |
| 12 | 0  | × | $\pi/2$  | + | 0 OR 1 | 12 |
| 13 | 1  | + | $\pi$    | + | 1      | 13 |

RECEIVED-BIT NUMBERS & BASIS INFORMATION

EFFECTIVE-BIT NUMBERS

| BIT NUMBER | RANDOM NUMBER | BASIS A | PHASE | BASIS B | OUTPUT | BIT NUMBER |
|---|---|---|---|---|---|---|
| 1 | −1 | + | $\pi$ | + | | |
| 2 | 1 | × | $3\pi/2$ | + | * | 1 |
| 3 | 0 | × | $\pi/2$ | + | 0 OR 1 | 2 |
| 4 | −1 | × | $3\pi/2$ | + | 0 OR 1 | 3 |
| 5 | 0 | + | 0 | × | * | 4 |
| 6 | 1 | + | $\pi$ | × | * | 5 |
| 7 | 0 | + | 0 | + | 1 | 6 |
| 8 | 0 | + | 0 | × | 0 OR 1 | 7 |
| 9 | 0 | × | $\pi/2$ | + | * | 8 |
| 10 | −1 | × | $3\pi/2$ | × | 0 | 9 |
| 11 | 1 | + | $\pi$ | × | * | 10 |
| 12 | 0 | × | $\pi/2$ | × | 0 OR 1 | 11 |
| 13 | 1 | + | $\pi$ | + | 0 OR 1 | 12 |

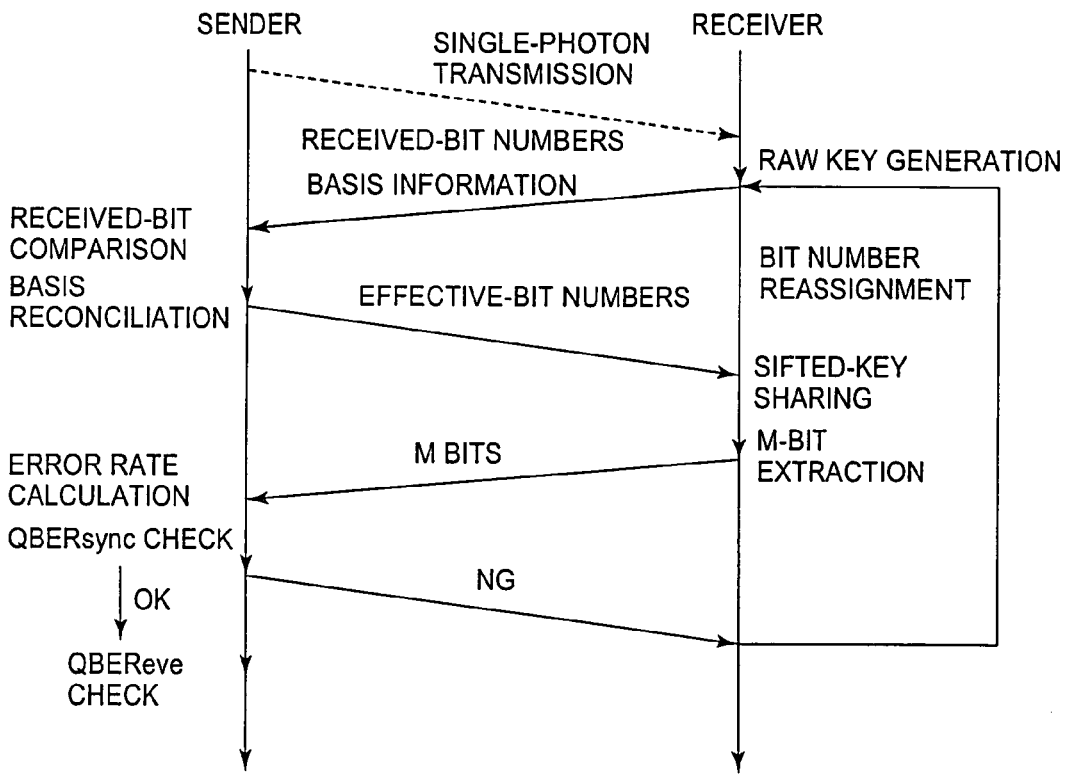
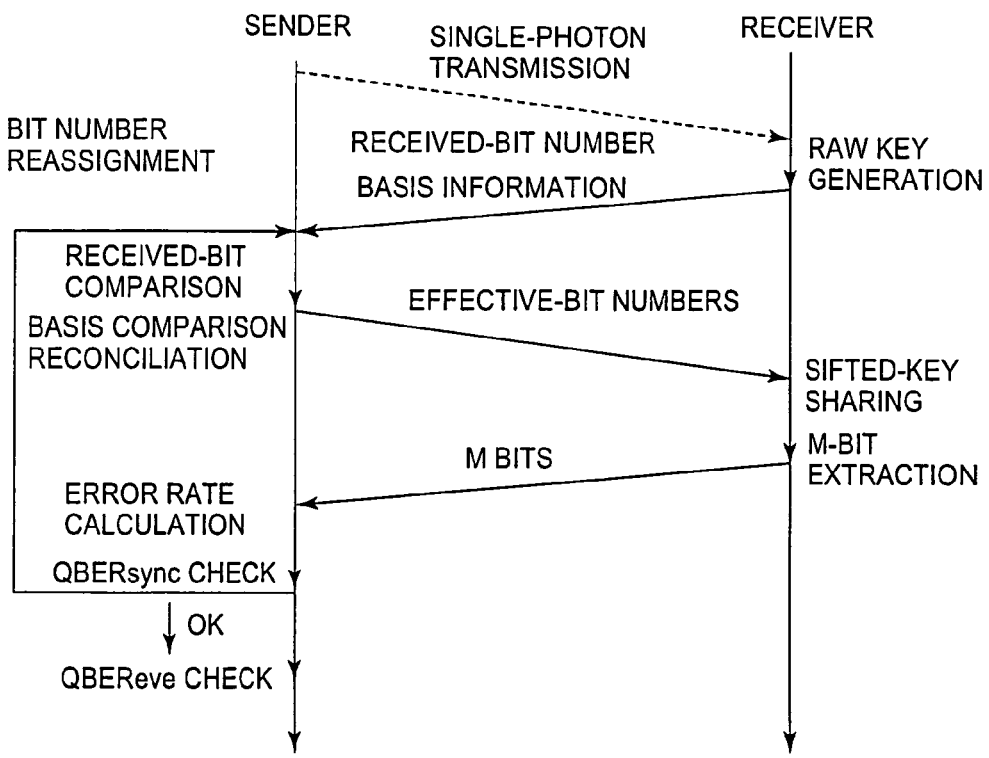

RECEIVED-BIT NUMBERS & BASIS INFORMATION

| BIT NUMBER | RANDOM NUMBER | BASIS A | BASIS B | OUTPUT | BIT NUMBER |
|---|---|---|---|---|---|
| 1 | 0 | + | + | 0 | 1 |
| 2 | 1 | × | + | * | |
| 3 | 1 | × | × | * | |
| 4 | 1 | × | × | 1 | 4 |
| 5 | 0 | + | × | * | |
| 6 | 0 | + | + | 0 | 6 |
| 7 | 0 | + | × | * | |
| 8 | 0 | + | + | 0 | 8 |
| 9 | 1 | × | × | * | |
| 10 | 1 | × | × | 1 | 10 |
| 11 | 0 | + | × | * | |
| 12 | 1 | × | + | * | |
| 13 | 0 | + | + | 1 | 13 |

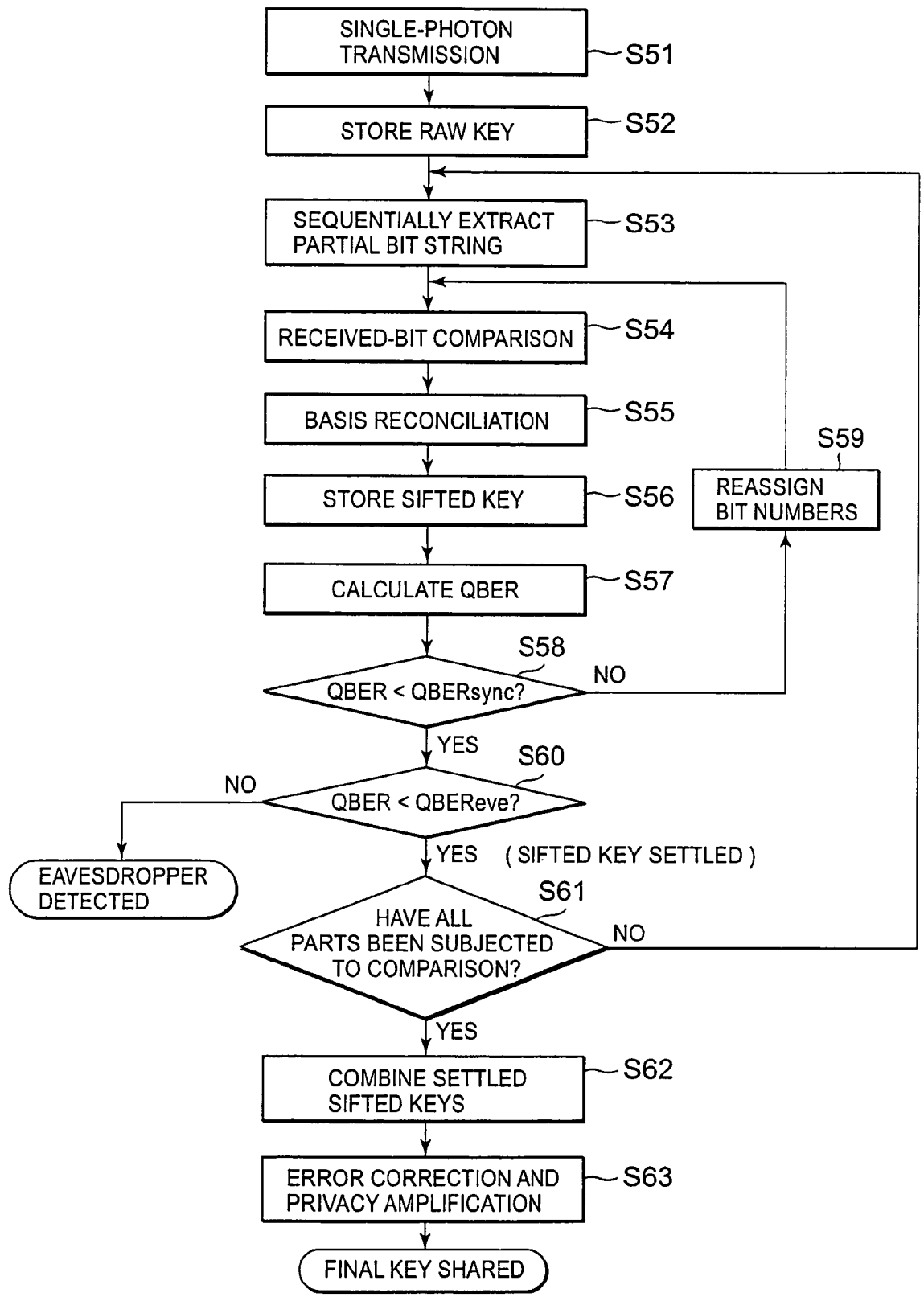

METHOD AND SYSTEM FOR GENERATING SHARED INFORMATION

BACKGROUND OF THE INVENTION

1. Field of the Invention

The present invention relates to a communication system using a communication channel that is relatively less reliable in communication and a communication channel that is relatively highly reliable in communication. Particularly, the present invention relates to a method and system for generating secret information shared between a sender and a receiver.

2. Description of the Related Art

In the field of quantum cryptography, based on Heisenberg's uncertainty principle, it is known that eavesdropping between a sender and a receiver can be detected with high probability. Conversely, this fact indicates that a sender and a receiver can share a secret bit string (cryptographic key) without being eavesdropped. For a procedure to share secret information, for example, the BB84 (Bennett Brassard 84) protocol using four quantum states is known as well as other protocols. A high level of security can be achieved by generating through this procedure a key for Vernam cipher, which has been proved to be absolutely secure. There have been proposed several techniques for sharing such a quantum cryptographic key.

For example, Japanese Patent Application Unexamined Publication No. 2000-174747 discloses a quantum cryptographic system in which a sender and a receiver share a secret key by using quantum and classical channels. Specifically, the sender extracts bit values from a random number list, finely modulates optical pulses according to the bit values, and sends out the modulated optical pulses through the quantum channel. The receiver extracts bit values from another random number list, re-modulates the received optical pulses according to the bit values, and notifies the sender through the classical channel whether or not photon detection occurs for each bit value. The sender constructs a random number list using only the bit values for which photon detection occurred on the receiver side. Thus, the sender and the receiver each store the random number list in common. Further, to check the presence of an eavesdropper, an appropriate number of check bits are extracted from each of the sender's and receiver's versions of the common random number list, and it is checked if they match up using the classical channel. When a sufficient number of the bits match up, the sender and the receiver use the bit string excluding the check bits as a shared secret key.

Japanese Patent Application Unexamined Publication No. 2004-112278 discloses a quantum key distribution method that enhances the efficiency in common-key generation by eliminating data errors occurring due to the passing of photons along a quantum communication line (quantum channel). More specifically, a sender sends through the quantum communication line photons in respective quantum states that are defined by a string of random numbers (transmission data) and randomly determined bases (transmission code). A receiver measures the received photons and obtains reception data that is defined by the results of this measurement and randomly determined bases (reception code). Thereafter, only the bits corresponding to matched bases are left to be kept by a procedure performed through the public communication line, whereby the sender and the receiver each store shared information. Subsequently, the sender sends through the public communication line a given number of bits of error correction information generated from a parity check matrix and the transmission data. The receiver corrects errors in the reception data by using the error correction information received, the reception data, and the same parity check matrix. Part of the shared information after correction is discarded according to the information revealed for the error correction, and a shared cryptographic key is made of the remaining information.

As described above, for a sender and a receiver to share information, both the sender and the receiver must specify which bits have been able to be detected correctly and which bits have not. In other words, in a quantum key distribution system, it is necessary to establish bit position synchronization between the sender and the receiver. The establishment of bit position synchronization is a major promise for a key generation flow. A final key cannot be generated unless synchronization is established.

However, according to the above-mentioned conventional methods, there remains a possibility that the bit positions lose synchronization due to the expansion and contraction of a transmission line and processing deviations occurring in devices involved. According to the key generation flow described in Japanese Patent Application Unexamined Publication No. 2000-174747, if the bit positions lose synchronization in practical operation, the check bits do not sufficiently match up, which is considered as the detection of an eavesdropper. Consequently, the key generation operation is performed again after bit position synchronization is reestablished. In this circumstance, all the key that has been generated by single-photon transmission comes to nothing, resulting in a significantly degraded efficiency in common-key generation.

Similarly, according to the method described in Japanese Patent Application Unexamined Publication No. 2004-112278, when the bit positions lose synchronization, the error rate of the reception data becomes very large, resulting in it being impossible to generate a common key. Additionally, no consideration is given to the processing to be performed when the error rate is large.

SUMMARY OF THE INVENTION

An object of the present invention is to provide a method and system for stably and efficiently generating shared information between communication devices.

Another object of the present invention is to provide a method and system that can achieve the efficient sharing of information by the prompt establishment of bit position synchronization.

In order to accomplish the above objects, according to the present invention, provisionally shared information is generated, which is used to carry out a determination of bit position synchronization. When the bit positions are out of synchronization, the bit positions are changed, and provisionally shared information is regenerated. Then, the determination of bit position synchronization is performed again based on regenerated provisionally shared information.

According to an aspect of the present invention, a method for generating shared information between a first communication device and a second communication device, which are connected by at least a first channel of relatively low reliability and a second channel of relatively high reliability, includes: a) sending original information from the first communication device to the second communication device through the first channel, wherein the original information comprises a string of bits whose bit positions are relatively determined; b) setting reference bit positions to be used for generating shared information between the first communication device and the second communication device through the second channel, to generate provisionally shared information based on information received from the first communication device through the first channel; c) determining whether synchronization is established based on the setting of the reference bit positions, by comparing part of a first version of the provisionally shared information on the first communication device with corresponding part of a second version of the provisionally shared information on the second communication device through the second channel; d) when it is determined that synchronization is not established, changing the setting of the reference bit positions to regenerate provisionally shared information in said b); and e) when it is determined that synchronization is established, generating the shared information based on present provisionally shared information.

The c) may include: calculating an error rate using the parts of the first and second versions; when the error rate is not smaller than a predetermined threshold value, determining that synchronization is not established; and when the error rate is smaller than the predetermined threshold value, determining that synchronization is established.

The setting of the reference bit positions may be changed by shifting the reference bit positions by at least one bit.

The e) may include: e.1) when synchronization is established, further determining whether an eavesdropper is present; and e.2) when no eavesdropper is present, generating the shared information based on present provisionally shared information. The e.1) may include: calculating an error rate using the parts of the first and second versions; when the error rate is not smaller than a predetermined eavesdropping-check threshold value, determining that an eavesdropper is present; and when the error rate is smaller than the predetermined eavesdropping-check threshold value, determining that no eavesdropper is present.

According to another aspect of the present invention, a method includes: a) sending original information from the first communication device to the second communication device through the first channel, wherein the original information comprises a string of bits whose bit positions are relatively determined; b) sequentially reading information received from the first communication device through the first channel at predetermined lengths; c) setting reference bit positions to be used for generating partial shared information between the first communication device and the second communication device through the second channel, to generate partial provisionally shared information based on partial information of the predetermined length; d) determining whether synchronization is established based on the setting of the reference bit positions, by comparing part of a first version of the partial provisionally shared information on the first communication device with corresponding part of a second version of the partial provisionally shared information on the second communication device through the second channel; e) when it is determined that synchronization is not established, changing the setting of the reference bit positions to regenerate partial provisionally shared information in said c); f) when it is determined that synchronization is established, generating the partial shared information based on present partial provisionally shared information; and g) when storing at least one piece of partial shared information related to information generating the shared information based on the information received from the first communication device through the first channel, generating the shared information based on the at least one piece of partial shared information.

According to the present invention, the bit positions of shared information set by a general scheme can be changed depending on whether the bit positions are in synchronization or out of synchronization. Accordingly, even in the case where the bit positions are out of synchronization, bit positions (e.g. bit numbers) are reassigned to the received bits, and shared information is regenerated, whereby synchronization determination can be performed again without terminating the key generation flow.

According to the present invention, in a quantum key distribution system for example, even in the case where synchronization is lost, synchronization determination can be performed by utilizing a raw key generated by single-photon transmission, without reestablishing synchronization. Accordingly, it is possible to achieve a stable, fast key generation rate.

BRIEF DESCRIPTION OF THE DRAWINGS

FIG. 9 is a sequence diagram showing operations for sifted key settlement according to the embodiment.

FIG. 10 is a sequence diagram showing operations for sifted key settlement according to a second embodiment of the present invention.

FIG. 14 is a flowchart showing a key generation flow in a quantum key generation scheme according to a fifth embodiment of the present invention.

DETAILED DESCRIPTION OF THE PREFERRED EMBODIMENTS

1. First Embodiment (System Configuration)

Figure 1:
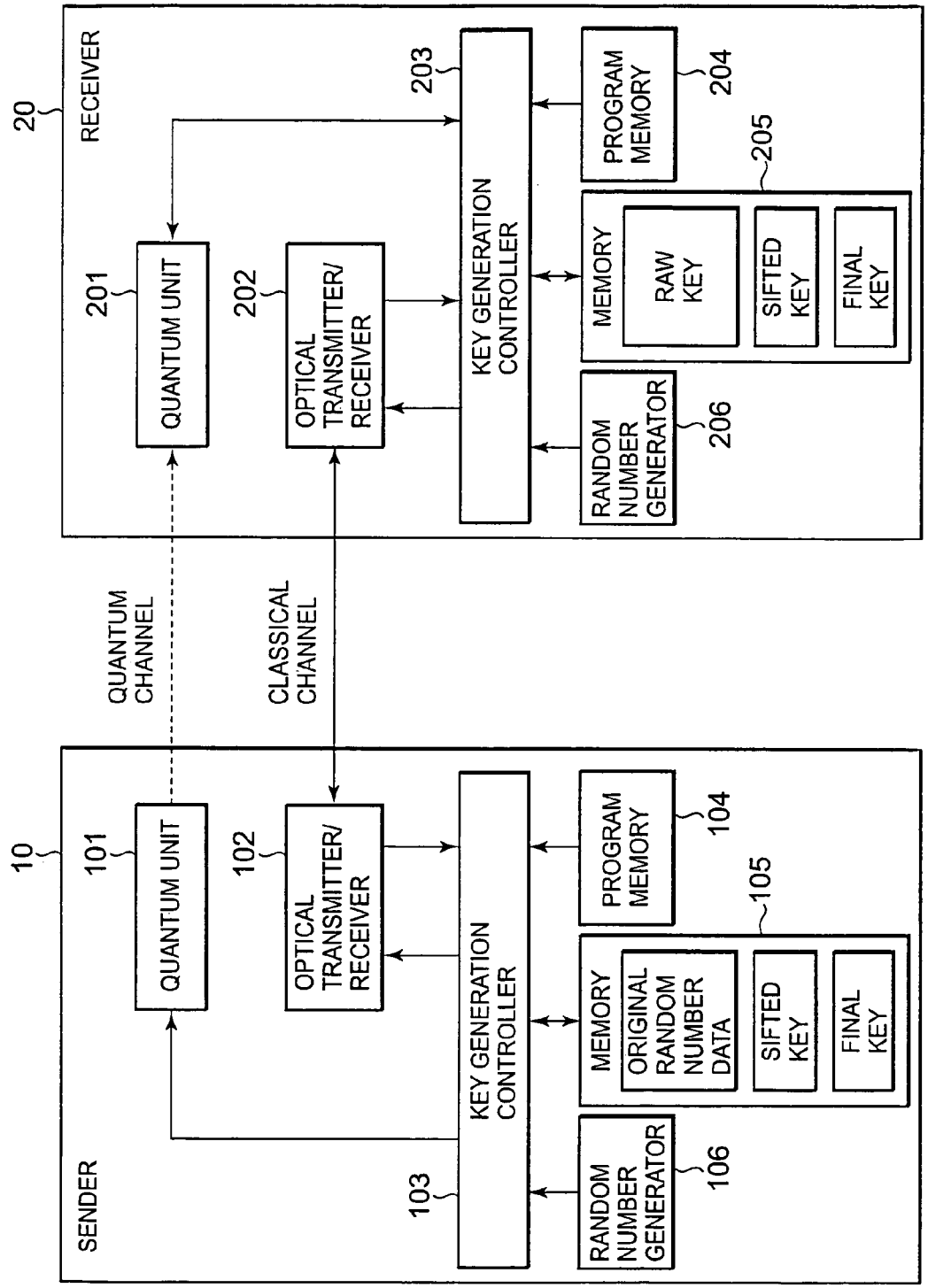
FIG. 1 is a block diagram showing a configuration of a quantum key distribution system according to an embodiment of the present invention.

FIG. 1 is a block diagram showing a configuration of a quantum key distribution system according to a first embodiment of the present invention. Referring to FIG. 1, the quantum key distribution system includes a sender 10 and receiver 20, which are connected by a quantum channel and a classical channel. Here, the quantum channel is a communication channel in a state where the optical power for transmission from the sender 10 to the receiver 20 is very weak, at the level of at most one photon per bit, whereas the classical channel is a communication channel in a range of optical power that is used in usual (conventional or usually used) optical communication.

The sender 10 is provided with a quantum unit 101 for single-photon transmission and an optical transmitter/receiver 102 for usual optical communication. The quantum unit 101 and the optical transmitter/receiver 102 are controlled by a key generation controller 103 that executes a key generation flow, which will be described later.

The key generation controller 103 can be implemented, for example, on a program-controlled processor such as CPU by using software. The key generation controller 103 executes a key generation program stored in a program memory 104 and carries out a key generation flow by using a memory 105 and a random number generator 106. As will be described later, the memory 105 can store original random-number data, a sifted key, and a final key. Moreover, it is assumed that the memory 105 stores an error rate threshold value $QBER_{sync}$ to be used for determining whether or not bit position synchronization is established and another error rate threshold value $QBER_{eve}$ to be used for determining whether or not an eavesdropper is present.

The receiver 20 is provided with a quantum unit 201 for single-photon reception and an optical transmitter/receiver 202 for usual optical communication. The quantum unit 201 and the optical transmitter/receiver 202 are controlled by a key generation controller 203 that executes a key generation flow, which will be described later.

The key generation controller 203 can be implemented, for example, on a program-controlled processor such as CPU by using software. The key generation controller 203 executes a key generation program stored in a program memory 204 and carries out a key generation flow by using a memory 205 and a random number generator 206.

(Key Generation Flow)

Figure 2:
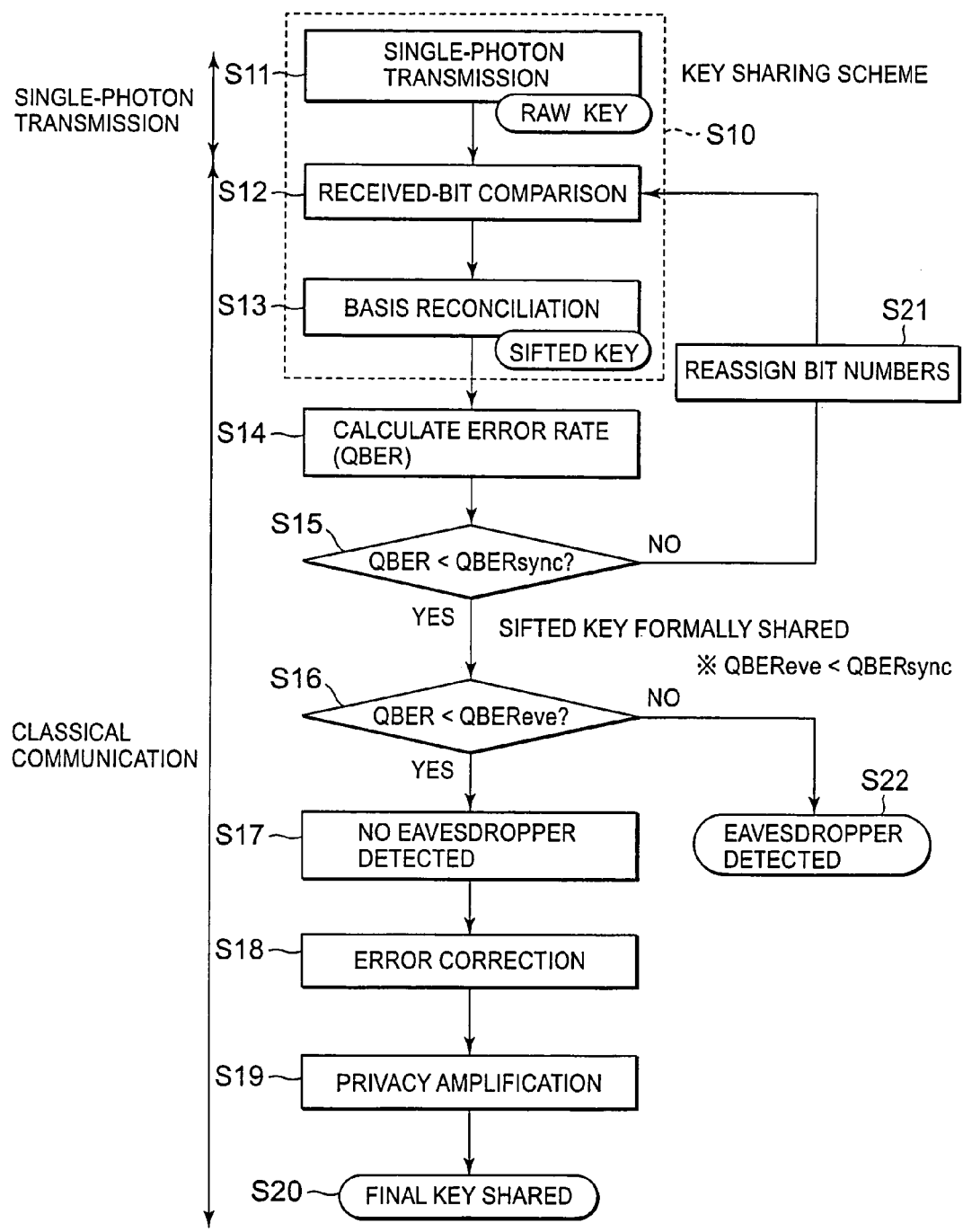
FIG. 2 is a flowchart showing a method of generating a cryptographic key according to the embodiment.

FIG. 2 is a flowchart showing a method of generating a cryptographic key according to the first embodiment. The sender 10 and the receiver 20 according to this embodiment share a cryptographic key through a key-sharing scheme S10. The key-sharing scheme S10 includes a single-photon transmission step S11 which is performed using the quantum channel, a received-bit comparison step S12 in which bits received by the receiver 20 are compared to the corresponding bits on the sender side, and a basis reconciliation step S13 in which the comparison of basis information is performed on the sender side to generate a sifted key. Although the step S11 is performed using the quantum channel, the subsequent processes in the key generation flow from the step S12 are all performed using the classical channel. A procedure of key generation is as follows, with BB84 using four quantum states taken as an example of the key-sharing scheme.

1.1) Raw Key Generation

Figure 3:
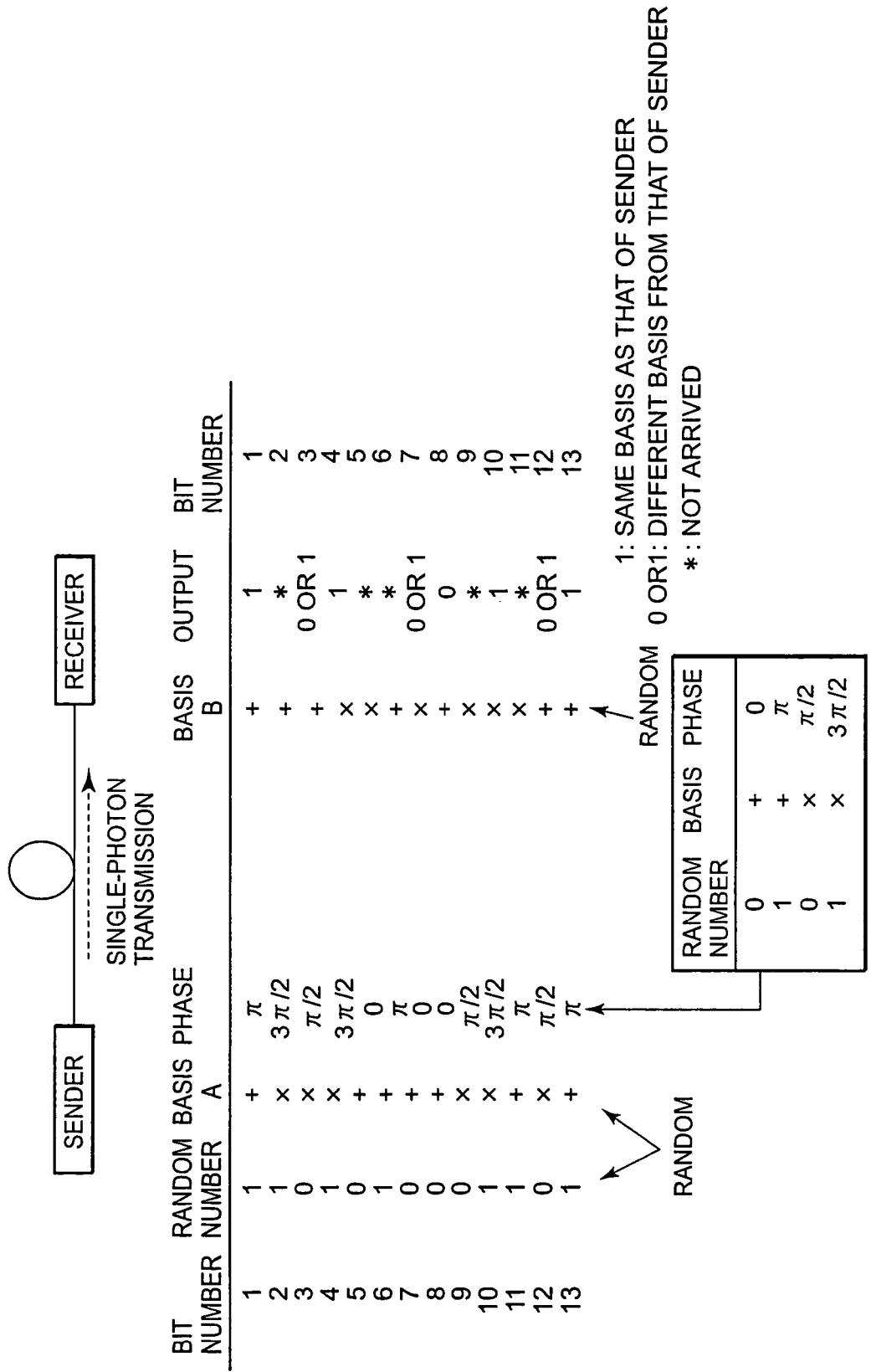
FIG. 3 is a schematic diagram showing an example of raw key generation, to describe a key generation flow according to the embodiment.

FIG. 3 is a schematic diagram showing an example of raw key generation, to describe the key generation flow according to the first embodiment. Referring to FIG. 3, a raw key is generated through the following procedure.

(1) The key generation controller 103 of the sender 10 generates original random-number data, which is the source of a cryptographic key, and basis information A ("+" basis, "×" basis) by using binary random data generated by the random number generator 106. The key generation controller 103 then generates four-valued phase modulation data by the combination of the original random-number data and the basis information A and stores the four-valued phase modulation data in the memory 105.

(2) The quantum unit 101 of the sender 10 phase-modulates each optical pulse into one of four phase states (0, $\pi$, $\pi/2$, or $3\pi/2$) according to the four-valued phase modulation data and sends the phase-modulated optical pulses to the receiver 20 through the quantum channel.

(3) The quantum unit 201 of the receiver 20 phase-modulates the optical pulses received from the sender 10 based on basis information B, which is random data, and then detects the optical pulses through an interferometer. This detected received data is called a raw key and stored in the memory 205 along with bit numbers that are assigned on the receiver side. Since the optical power on the quantum channel is very weak, most of the optical bit pulses sent from the sender 10 are lost because of the loss on the way through the transmission line, and only a very small number of the pulses can arrive at the receiver 20.

1.2) Received-Bit Comparison

Figure 4:
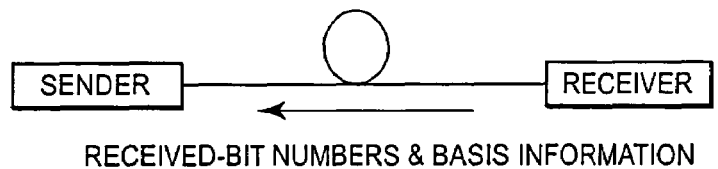
FIG. 4 is a schematic diagram showing an example of received-bit comparison, to describe the key generation flow according to the embodiment.

FIG. 4 is a schematic diagram showing an example of received-bit comparison, to describe the key generation flow according to the first embodiment. Referring to FIG. 4, received-bit comparison is carried out through the following procedure.

(4) The receiver 20 sends the sender 10, through the classical channel, the bit numbers of the raw key that was able to be received, i.e., the bit numbers (received-bit numbers) assigned to a string of bits output from the quantum unit 201. The receiver 20 also sends the basis information B corresponding to these bits.

(5) Based on the received-bit numbers sent from the receiver 20, the key generation controller 103 of the sender 10 discards, from the original random-number data, those bits that could not be received by the receiver 20. However, the original random-number data is kept stored in its entirety.

1.3) Provisional Sharing of Sifted key

Figure 5:
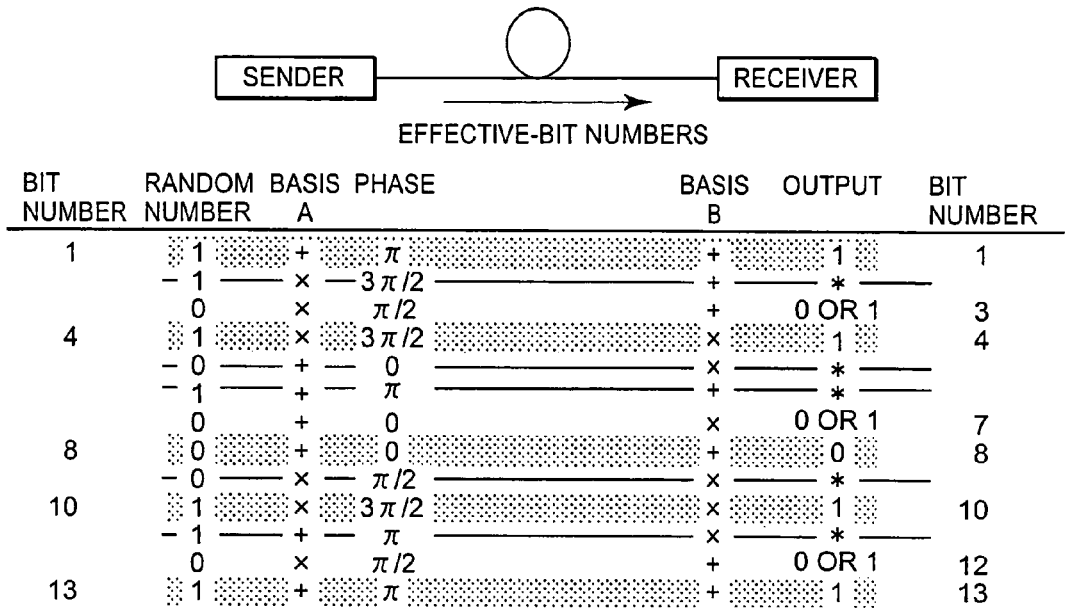
FIG. 5 is a schematic diagram showing an example of basis reconciliation, to describe the key generation flow according to the embodiment.

FIG. 5 is a schematic diagram showing an example of basis reconciliation, to describe the key generation flow according to the first embodiment. Referring to FIG. 5, basis reconciliation is carried out through the following procedure.

(6) The key generation controller 103 of the sender 10 compares the basis information B sent from the receiver 20 with the basis information A stored. Those bits corresponding to unmatched bases are discarded from the original random-number data.

(7) The sender 10 stores, as a sifted key, a string of the remaining bits in the original random-number data, which have not been discarded, and sends the bit numbers (effective-bit numbers) assigned to these remaining bits to the receiver 20 through the classical channel. However, the data of bits corresponding to the bit numbers other than the effective-bit numbers is also kept stored in the memory 105.

(8) The key generation controller 203 of the receiver 20 keeps only those bits corresponding to the effective-bit numbers received from the sender 10 and stores the bits as the sifted key in the memory 205. However, the data of bits corresponding to the bit numbers other than the effective-bit numbers is also kept stored in the memory 205.

In this way, through the key-sharing scheme S10, the sifted key is shared as a cryptographic key between the sender 10 and the receiver 20. However, this sharing is provisional because there is a possibility that this sifted key will be changed in the following steps.

1.4) Determination of Bit Position Synchronization Establishment

Once the sifted key is provisionally shared between the sender 10 and the receiver 20, it is determined whether or not bit position synchronization is established between the sender 10 and the receiver 20 (steps S14 and S15 in FIG. 2).

First, the key generation controller 203 of the receiver 20 samples M bits of receiver's version of the sifted key shared through the key-sharing scheme. The data of the M bits sampled and their bit numbers are sent to the sender 10 through the classical channel. The M bits for error check may be selected sequentially or randomly.

The key generation controller 103 of the sender 10 compares the sampled M-bit data received from the receiver 20 with data of the sifted key stored in the memory 105 corresponding to the same bit numbers as those of the received M-bit data. Then, the key generation controller 103 calculates a bit error rate QBER (step S14). The M bits used for error check are discarded at both sides.

Next, the key generation controller 103 compares the calculated bit error rate QBER with the error rate threshold value $QBER_{sync}$ for synchronization determination, which is used for determining whether or not bit position synchronization is established (step S15). If $QBER \geq QBER_{sync}$ (NO in step S15), it is determined that bit position synchronization is not established, and the undermentioned bit number reassignment is performed (step S21). The bit number reassignment step S21 may be performed by any of the sender 10 and the receiver 20. In this embodiment, it is assumed to be performed by the receiver 20.

Figure 6:
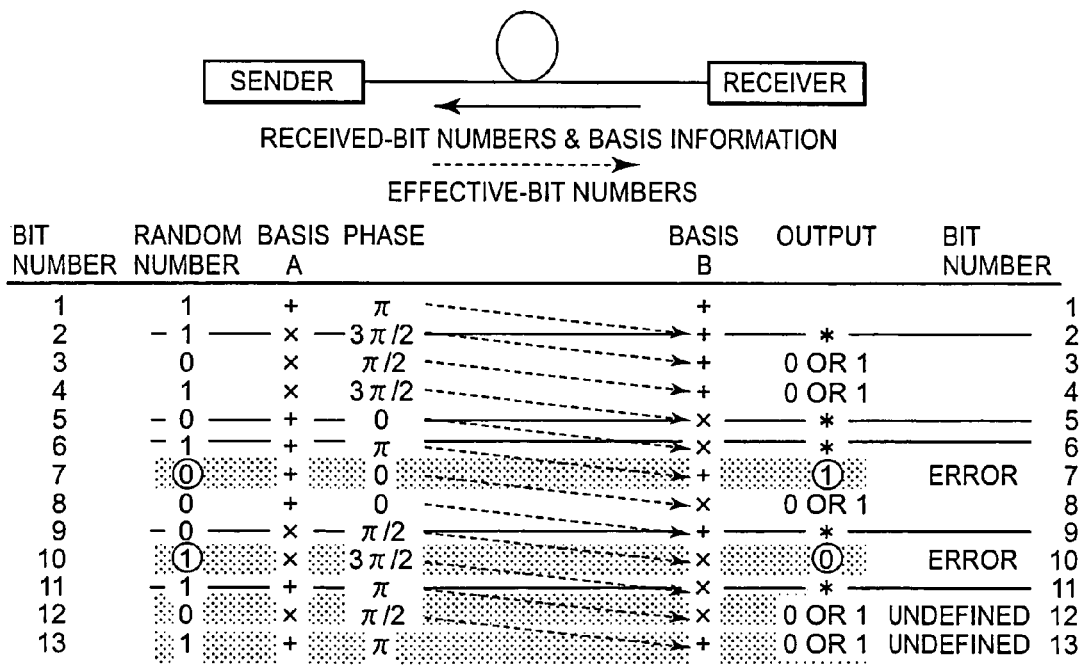
FIG. 6 is a schematic diagram showing an example in which bit position synchronization is not established between a sender and a receiver.

FIG. 6 is a schematic diagram showing an example in which bit position synchronization is not established between the sender 10 and the receiver 20. In this example, a random number (in the original random-number data) sent by the sender 10 with a basis corresponding to the bit number 1 is received by the receiver 20 with a basis corresponding to the bit number 2. Accordingly, thereafter, in the received-bit comparison step S12 and the basis reconciliation step S13, comparison is carried out based on different bit positions between the sender side and the receiver side. Therefore, the sender-side sifted key and the receiver-side sifted key which should be obtained for sharing by the sender 10 and the receiver 20 have no correlation with each other, resulting in the calculated bit error rate QBER becoming a large value, nearly 0.5.

With consideration for this phenomenon, the error rate threshold value $QBER_{sync}$ for synchronization determination is set at a value larger than an error rate threshold value $QBER_{eve}$ for eavesdropping determination, as will be described later. When $QBER \geq QBER_{sync}$ (NO in step S15), the key generation controller 103 determines that bit position synchronization is not established and notifies the receiver 20 that bit position synchronization is not established (NG).

1.5) Bit Number Reassignment

Upon the receipt of the notification of out-of-synchronization, the key generation controller 203 of the receiver 20 reassigns bit numbers to the received bits by shifting by one bit the bit numbers that are the references for the raw key and are stored in the memory 205 (step S21). Note that the amount of shifting of the bit numbers is not limited to one bit.

Figure 7:
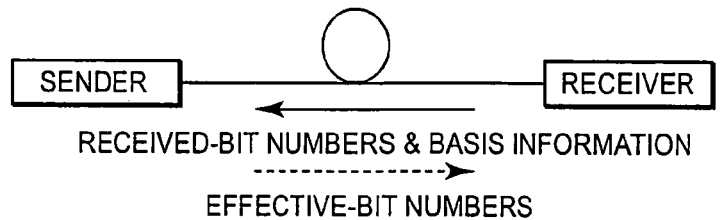
FIG. 7 is a schematic diagram showing a case where, in the example shown in FIG. 6 where the bit positions are out of synchronization, bit numbers are slid so that new bit numbers are reassigned.

FIG. 7 is a schematic diagram showing a case where, in the example shown in FIG. 6 where the bit positions are out of synchronization, the bit numbers are shifted so that new bit numbers are reassigned. Here, the new bit numbers are reassigned by subtracting one from each of the received-bit numbers. The new received-bit numbers and corresponding basis information are sent to the sender 10 through the classical channel. Then, the above-mentioned received-bit comparison step S12, basis reconciliation step S13, error rate calculation step S14, and bit position synchronization establishment determination step S15 are repeated. The bit number reassignment step S21 and the steps S12 through S15 will be repeated as described above until the calculated error rate QBER becomes smaller than the error rate threshold value $QBER_{sync}$ for synchronization determination (YES in step S15).

In the step S15, when the calculated error rate QBER becomes smaller than the error rate threshold value $QBER_{sync}$ for synchronization determination (YES in step S15), it is recognized that bit position synchronization is established, and the sifted key at this time is settled as a formal sifted key. When the sifted key is thus settled, all bits of the raw key excluding the bits used as the formal sifted key are discarded.

1.6) Error Rate Threshold Value ($QBER_{sync}$, $QBER_{eve}$)

Since there is no correlation between the sender's and receiver's versions of the sifted key shared in the state where the bit positions are out of synchronization, the error rate threshold value $QBER_{sync}$ for synchronization determination is set to be larger than the error rate threshold value $QBER_{eve}$ for eavesdropping determination. Specifically, these error rate threshold values are determined as follows.

Figure 8:
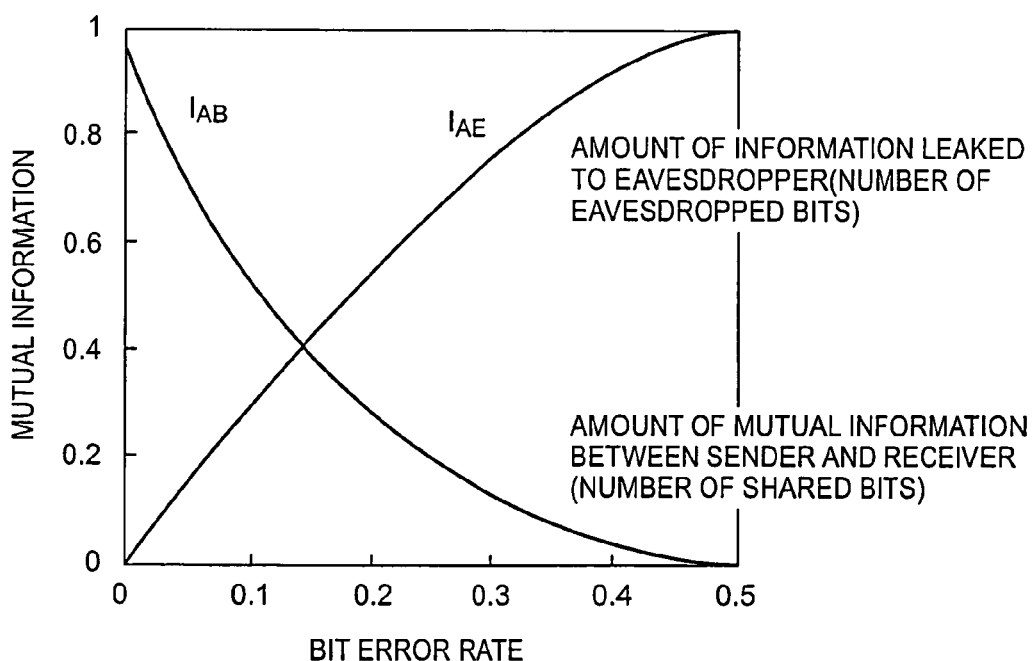
FIG. 8 is a graph showing the amount of mutual information between a sender and a receiver varying with the bit error rate, and the amount of information leaked to an eavesdropper varying with the bit error rate.

FIG. 8 is a graph showing the amount of mutual information (the number of shared bits) between a sender and a receiver varying with the bit error rate, as well as the amount of leaked information (the number of eavesdropped bits) varying with the bit error rate. As the bit error rate increases, the amount of mutual information between the sender and receiver decreases as the curve $I_{AB}$ shows, whereas the amount of information leaked to an eavesdropper increases as the curve $I_{AE}$ shows. In this example, the curves $I_{AB}$ and $I_{AE}$ intersect around a bit error rate of 0.15. Therefore, the error rate threshold value $QBER_{eve}$ for eavesdropping determination is set at a bit error rate of 0.15 or lower, at which the amount of information intercepted by an eavesdropper does not exceed the amount of information shared between the sender and receiver.

On the other hand, when the bit positions are out of synchronization, there is no correlation between the sampled M-bit data, used for error rate calculation, on the sender side and on the receiver side. Consequently, the bit error rate becomes nearly 50%. Therefore, the error rate threshold value $QBER_{sync}$ for synchronization determination is set at a value between 0.15 and 0.5.

1.7) Sifted Key Settlement Sequence

As described above, the sifted key is formally settled by the provisional sifted key sharing steps S11 through S13, bit position synchronization establishment determination steps S14 and S15, and bit number reassignment step S21 shown in FIG. 2. These operations for sifted key settlement are carried out through intercommunications between the sender 10 and the receiver 20.

FIG. 9 is a sequence diagram showing operations for sifted key settlement according to the first embodiment. When a raw key is generated on the receiver side by single-photon transmission, the receiver 20 sends received-bit numbers assigned to the bits of the raw key, which were able to be received, and basis information corresponding to these received bits to the sender 10 through the classical channel. The sender 10 performs the received-bit comparison and basis reconciliation and sends effective-bit numbers to the receiver 20. Once a sifted key is provisionally shared based on bit data corresponding to the effective-bit numbers, the receiver 20 randomly extracts M bits for error check and sends these M bits to the sender 10. The sender 10 calculates an error rate by using the received M bits and determines whether or not bit position synchronization is established ($QBER_{sync}$ check). When it is determined that bit position synchronization is not established, the sender 10 sends "NG" to the receiver 20. Upon the receipt of "NG", the receiver 20 performs the bit number reassignment by shifting the bit numbers that are the references for the raw key. Thereafter, in accordance with new bit numbers, a sifted key is provisionally shared, and $QBER_{sync}$ check is carried out again. In the $QBER_{sync}$ check, when synchronization establishment is recognized (OK), the then sifted key is settled. Subsequently, eavesdropping determination ($QBER_{eve}$ check) is performed.

1.8) Eavesdropping Determination

When the establishment of bit position synchronization is recognized, the key generation controller 103 of the sender 10 compares the calculated error rate QBER with the error rate threshold value $QBER_{eve}$ for eavesdropping determination, which is used for determining whether or not an eavesdropper is present (step S16 in FIG. 2). As described above, when $QBER<QBER_{eve}$ (YES in step S16), it is determined that no eavesdropper is present (step S17). After an error correction step S18 and a privacy amplification step S19 have been performed, a final key to be ultimately shared between the sender 10 and the receiver 20 is determined.

As described hereinabove, even in the case where the bit positions lose synchronization and the error rate becomes large, a sifted key can be regenerated from the raw key that has been generated by single-photon transmission, by the reassignment of the received-bit numbers on the receiver side. Accordingly, it is possible to achieve a secure, stable, fast key generation rate.

2. Second Embodiment

In the first embodiment, as described above, when $QBER \geq QBER_{sync}$ in the step S15 in FIG. 2, it is determined that bit position synchronization is not established, and a notification to that effect (NG) is sent from the sender 10 to the receiver 20. Then, the bit number reassignment step S21 is performed on the receiver side. As another method, it is possible to perform this bit number reassignment step S21 on the sender side.

FIG. 10 is a sequence diagram showing operations for sifted key settlement according to a second embodiment of the present invention. The general flow in the second embodiment is as described in conjunction with FIG. 2, and therefore a detailed description thereof will be omitted.

First, when a raw key is generated on the receiver side by single-photon transmission (step S11 in FIG. 2), the receiver 20 sends received-bit numbers assigned to the bits of the raw key, which were able to be received, and basis information corresponding to these bits to the sender 10 through the classical channel. The sender 10 carries out the received-bit comparison and basis reconciliation and sends effective-bit numbers to the receiver 20, thus provisionally sharing a sifted key based on bit data corresponding to the effective-bit numbers (steps S12 and S13). Subsequently, the receiver 20 randomly extracts M bits for error check and sends these M bits to the sender 10.

The sender 10 calculates an error rate by using the received M bits (step S14). The sender 10 first determines whether or not bit position synchronization is established ($QBER_{sync}$ check, step S15). When it is determined that bit position synchronization is not established, the sender 10 performs bit number reassignment by shifting the bit numbers assigned to the original random-number data by one bit (step S21). Thereafter, the above-described received-bit comparison and basis reconciliation are carried out again in accordance with the new bit numbers. Thus, a sifted key is provisionally shared, and $QBER_{sync}$ check is performed again. The above operation of bit number reassignment is repeated until the calculated error rate QBER becomes smaller than the error rate threshold value $QBER_{sync}$ for synchronization determination. When synchronization establishment is recognized (OK) in the $QBER_{sync}$ check, the sifted key is settled. Thereafter, the eavesdropping determination steps S16 and S17, error correction step S18, and privacy amplification step S19 are carried out, and then a final key to be ultimately shared between the sender 10 and the receiver 20 is determined. Note that as long as the receiver 20 receives no notification of the effective-bit numbers from the sender 10, the receiver 20 generates the final key from the provisional sifted key then stored.

In the second embodiment, as described above, even in the case where the bit positions lose synchronization and the error rate becomes large, a sifted key can be regenerated by reassigning, on the sender side, bit numbers to the random numbers sent by the sender and then returning the operation process to the step immediately after the raw key is generated. Accordingly, it is possible to achieve a secure, stable, fast key generation rate.

3. Third Embodiment

The quantum units 101 and 102 for single-photon transmission and the optical transmitters/receivers 102 and 202 for usual optical communication in FIG. 1 are not limited to a specific scheme. Hereinafter, as a preferred embodiment, a quantum key distribution system in plug and play scheme will be described. The plug and play scheme is regarded as one of the promising schemes for putting the polarization-sensitive quantum key distribution systems to practical use, because the plug and play scheme can compensate polarization fluctuations occurring over an optical fiber transmission line.

Figure 11:
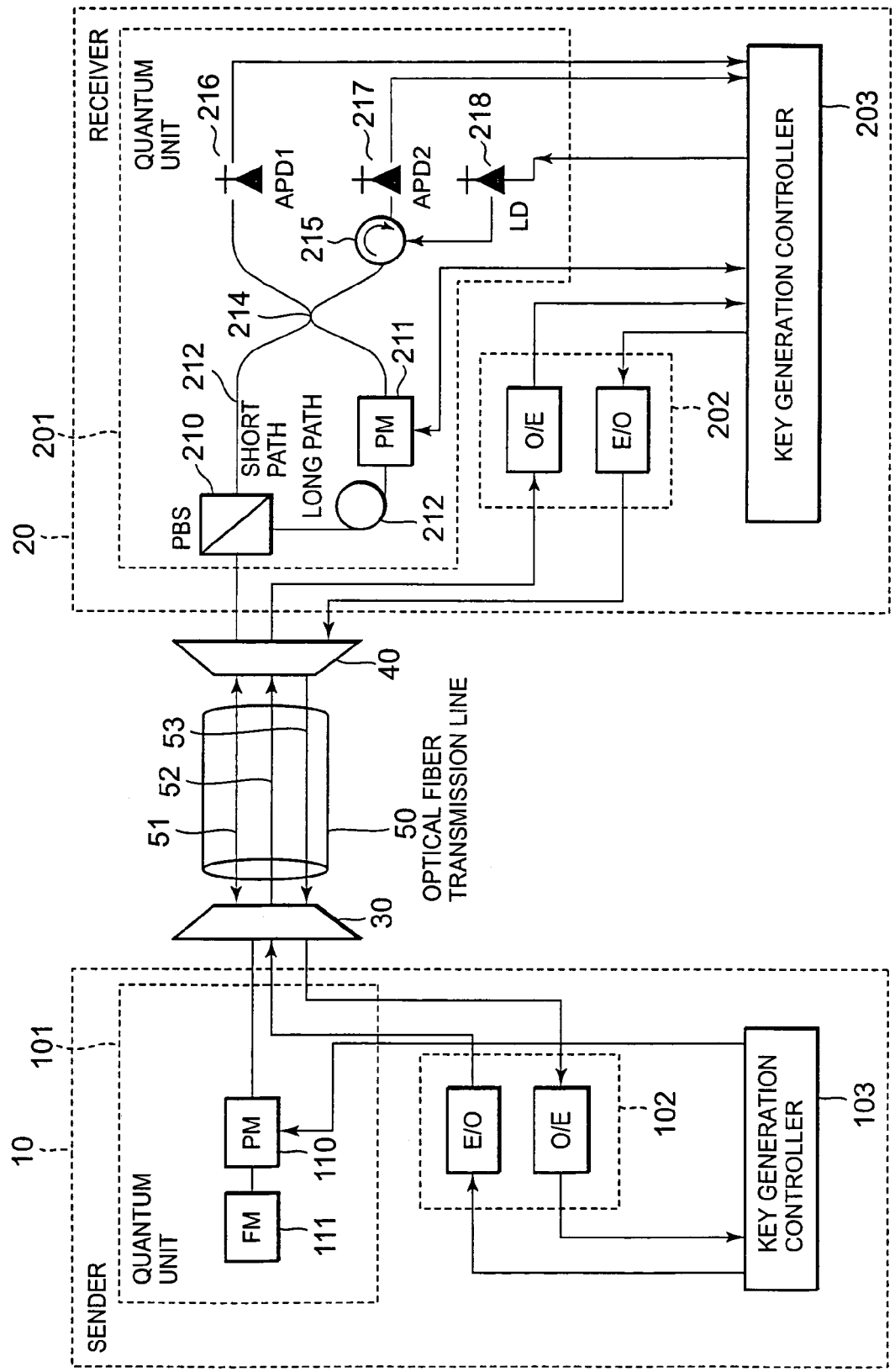
FIG. 11 is a block diagram showing a configuration of a quantum key distribution system in the plug and play scheme according to a third embodiment of the present invention.

FIG. 11 is a block diagram showing a configuration of a quantum key distribution system in the plug and play scheme according to a third embodiment of the present invention. The quantum key distribution system according to this embodiment includes a sender 10, a receiver 20, a sender-side wavelength multiplexer/demultiplexer 30, and a receiver-side wavelength multiplexer/demultiplexer 40. The sender-side wavelength multiplexer/demultiplexer 30 and the receiver-side wavelength multiplexer/demultiplexer 40 are optically connected through a single optical fiber transmission line 50. The sender 10 has a sender-side quantum unit 101 and an optical transmitter/receiver 102, which includes an electrical-to-optical converter (E/O) and an optical-to-electrical converter (O/E). The receiver 20 has a receiver-side quantum unit 201 and an optical transmitter/receiver 202, which includes an electrical-to-optical converter (E/O) and an optical-toelectrical converter (O/E). A quantum channel 51 and classical channels 52 and 53 are multiplexed on the optical fiber transmission line 50.

The sender-side quantum unit 101 has a phase modulator (PM) 110 and a faraday mirror (FM) 111. The phase modulator 110 performs phase modulation according to original random-number data, which is the source data of a cryptographic key, and random data, which is basis information ("+" basis, "×" basis) used in modulation.

The receiver-side quantum unit 201 includes: an interferometer composed of a polarization beam splitter (PBS) 210, a phase modulator 211, a short path 212, a long path 213, and an optical coupler 214; an optical circulator 215; avalanche photodiodes (APD) 216 and 217, which are photo detectors; and a laser (LD: Laser Diode) 218, which is a pulse light source. Note that the short path 212 and the long path 213 are made of polarization maintaining fiber and the optical coupler 214 and the optical circulator 215 are of polarization maintaining types.

The quantum unit 101 and the optical transmitter/receiver 102 are controlled by a key generation controller 103 as described earlier, and the quantum unit 201 and the optical transmitter/receiver 202 are controlled by a key generation controller 203 as described earlier.

In such a configuration, the key generation controller 203 controls the laser 208 so that the laser 208 outputs optical pulses P. By the optical circulator 215, an optical pulse P is output to the optical coupler 214, where the optical pulse P split into two parts. The split optical pulse P1 and optical pulse P2 go along the short path 212 and long path 213, respectively, and via the wavelength multiplexer/demultiplexer 40, are sent to the sender 10 through the quantum channel 51.

At the sender 10, after demultiplexed by the wavelength multiplexer/demultiplexer 30, each received optical pulse is reflected by the faraday mirror 111 while its polarization state is rotated by 90 degrees. The returned optical pulse P1 is transmitted as it is to the wavelength multiplexer/demultiplexer 30, whereas the optical pulse P2 is modulated by the phase modulator 110 and output to the wavelength multiplexer/demultiplexer 30 as phase-modulated optical pulse $P2^{*a}$. Thus, the returned optical pulse P1 and the phase-modulated optical pulse $P2^{*a}$ are sent to the receiver 20 through the quantum channel 51.

The wavelength multiplexer/demultiplexer 40 demultiplexes the wavelengths on the quantum channel and classical channel. The wavelength multiplexer/demultiplexer 40 outputs the optical pulse P1 and optical pulse $P2^{*a}$ on the quantum channel to the quantum unit 201 and outputs optical signals on the classical channel to the optical transmitter/receiver 202. The optical pulse P1 on the quantum channel having passed through the wavelength multiplexer/demultiplexer 40 is output to the long path 213 by the PBS 210. The optical pulse P1 is then modulated by the phase modulator 211 in accordance with basis information inputted from the key generation controller 203. The phase modulator 211 outputs phase-modulated optical pulse $P1^{*b}$ to the optical coupler 214. On the other hand, the optical pulse $P2^{*a}$ on the quantum channel having passed through the wavelength multiplexer/demultiplexer 40 is output to the short path 212 by the PBS 210 and then output as it is to the optical coupler 214. In this way, the optical pulse $P1^{*b}$ and the optical pulse $P2^{*a}$ are made to interfere with each other, with a phase difference according to the sender-side phase modulator 110 and the receiver-side phase modulator 210, and the result of interference is detected by the photo detector, APD 216 or 217. That is to say, polarization fluctuations occurring over the optical fiber transmission line 50 can be compensated. Thereafter, a sifted key and then a final key are determined by the steps S11 through S21 described in conjunction with FIG. 2.

A key generation flow according to FIG. 11 will be described briefly. The received data detected by the quantum unit 201 of the receiver 20 is stored as a raw key in a memory 205 (step S11). Subsequently, the key generation controller 203 sends received-bit numbers assigned to the bits of the raw key and basis information used when receiving these bits, to the sender 10 through the classical channel 53 by using E/O of the optical transmitter/receiver 202. Among random numbers that the sender 10 sent, the key generation controller 103 of the sender 10 selects those bits that were able to be received by the receiver 20, based on the received-bit numbers received by using O/E of the optical transmitter/receiver 102 (step S12). Further, the key generation controller 103 compares the basis information received by using O/E of the optical transmitter/receiver 102 with corresponding basis information that the sender 10 has stored. Among the random numbers that the sender 10 sent, the key generation controller 103 keeps only those bits corresponding to matched bases and sends bit numbers assigned to these remaining effective bits to the receiver 20 through the classical channel 52 by using E/O of the optical transmitter/receiver 102. Among the received bits that the receiver 20 has stored, the receiver 20 selects only those bits corresponding to the effective-bit numbers received (step S13). In this way, a sifted key as a cryptographic key is provisionally shared between the sender 10 and the receiver 20 through the key-sharing scheme S10.

Here, bits to serve as the references for counting the bit numbers are determined by the sender 10 and sent to the receiver 20 through the classical channel 52. However, no exact synchronization is achieved because the wavelengths on the classical channel and on the quantum channel are different from each other. Moreover, even if the reference bits are sent through the classical channel, there remains a possibility that the bit positions lose synchronization due to the expansion and contraction of fiber with temperature changes and the like, as well as processing deviations occurring in the devices.

Therefore, part (M bits) of the receiver's version of the provisionally shared sifted key is compared with the corresponding part of the sender's version, and a bit error rate is calculated (step S14). The calculated bit error rate QBER is compared with a threshold value $QBER_{sync}$ for the determination of bit position synchronization establishment. When $QBER \geq QBER_{sync}$, it is determined that bit position synchronization is not established. Therefore, on the receiver side, the bit numbers assigned to the bits that were able to be received by the receiver 20 are shifted by one bit (step S21), and the process returns to the received-bit comparison step S12 again. When $QBER < QBER_{sync}$, it is determined that bit position synchronization is established, and the steps S16 through S20 for final key generation are carried out.

As described above, as well in the third embodiment as in the first embodiment, even in the case where the bit positions lose synchronization and the error rate becomes large, a sifted key can be regenerated from the raw key that has been generated by single-photon transmission, by the reassignment of the received-bit numbers on the receiver side. Accordingly, it is possible to achieve a secure, stable, fast key generation rate.

Moreover, the plug and play system according to this embodiment has the advantage that polarization fluctuations occurring over the optical fiber transmission line 50 can be compensated.

4. Fourth Embodiment

Figure 12:
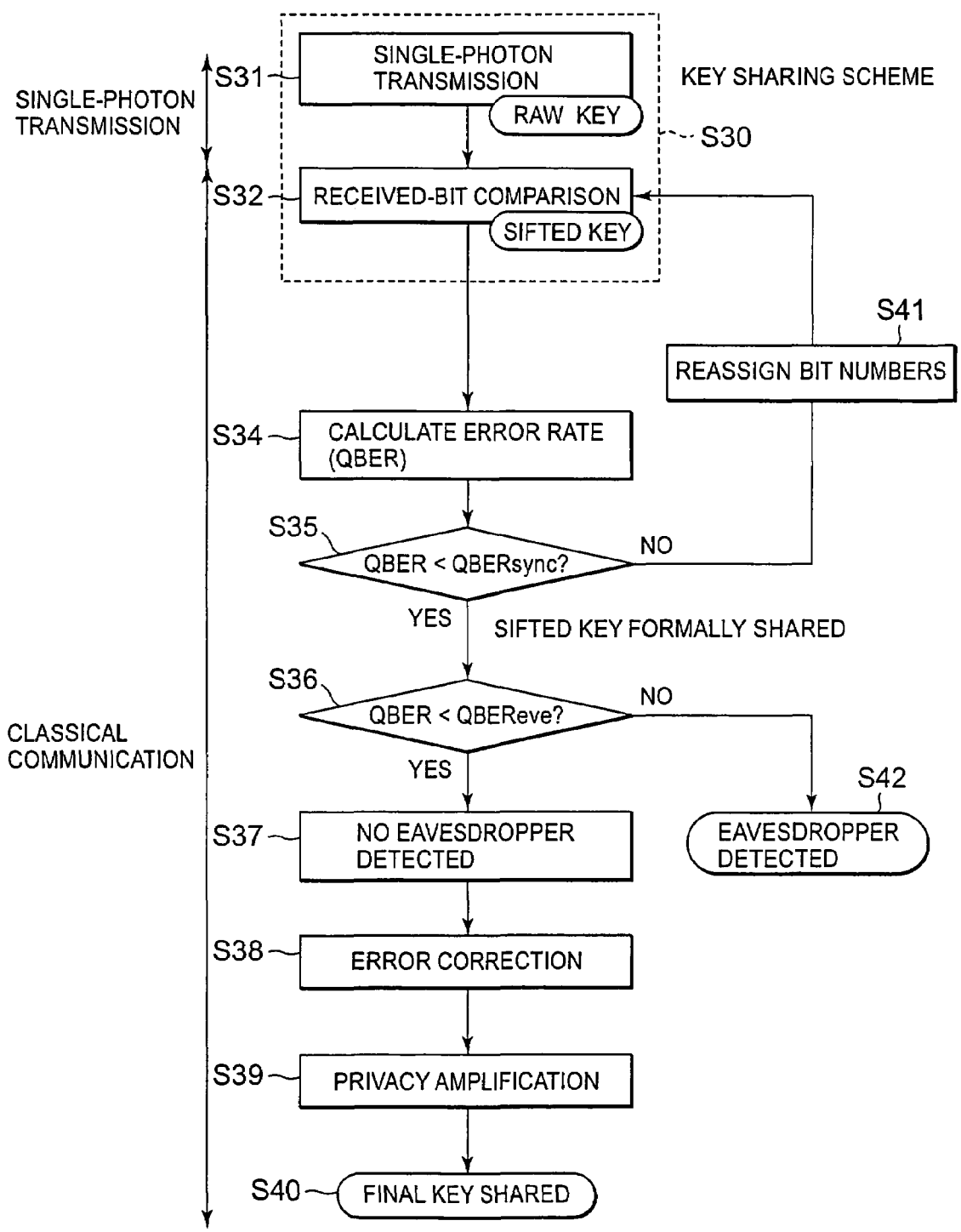
FIG. 12 is a flowchart showing a key generation flow in a quantum key generation scheme according to a fourth embodiment of the present invention.
Figure 13:
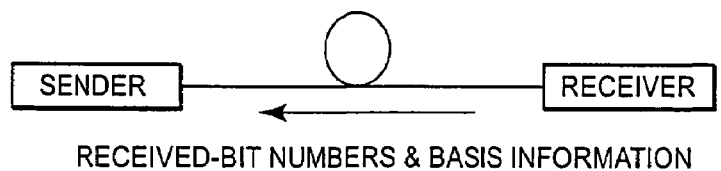
FIG. 13 is a schematic diagram showing a specific example of a procedure according to the B92 protocol, which is used in the fourth embodiment.

FIG. 12 is a flowchart showing a key generation flow in a quantum key generation scheme according to a fourth embodiment of the present invention. FIG. 13 is a schematic diagram showing a specific example of a procedure according to the B92 protocol, which is used in this embodiment.

First, a sender generates original random-number data, which is the source of a cryptographic key. The sender sends optical pulses to a receiver through a quantum channel, with the "+" basis when a random number is "0" and with the "×" basis when a random number is "1". On the other hand, the receiver receives the optical pulses using two-valued random bases, "+" and "×" bases (step S31).

The receiver notifies the sender, through a classical channel, of bit numbers assigned to the bits detected and bases used when receiving these bits. Among the random numbers that the sender sent, the sender selects those bits that were able to be received by the receiver and keeps these bits as a sifted key (step S32). Through this key-sharing scheme S30, the sifted key is shared between the sender and the receiver.

Next, part of the receiver's version of the sifted key is compared with the corresponding part of the sender's version, and a bit error rate is calculated (step S34). The calculated bit error rate QBER is compared with a threshold value $QBER_{sync}$ for the determination of bit position synchronization establishment. When $QBER \geq QBER_{sync}$, the bit numbers assigned to the bits that were able to be received by the receiver are shifted by one bit for reassignment as described above (step S41). Then, the process returns to the received-bit comparison step S32. When $QBER < QBER_{sync}$, final key generation steps S36 through S40 are carried out.

As described above, as well in the fourth embodiment as in the first embodiment, even in the case where the bit positions lose synchronization and the error rate becomes large, a sifted key can be regenerated from the raw key that has been generated by single-photon transmission, by the reassignment of the received-bit numbers on the receiver side. Accordingly, it is possible to achieve a secure, stable, fast key generation rate.

5. Fifth Embodiment

It is not always the case that the bit positions of a raw key generated on the receiver side by single-photon transmission are uniformly out of synchronization. For example, it is conceivable that a leading part of a raw key on the receiver side deviates from the corresponding part on the sender side by one bit and an end part of the raw key deviates by two bits. Even in such a case, with the application of the present invention, a sifted key can be regenerated from the raw key that has been generated by single-photon transmission, by the reassignment of the bit numbers. Accordingly, it is possible to achieve a secure, stable, fast key generation rate. Hereinafter, a fifth embodiment of the present invention will be described taking the BB84 protocol as an example. Note that the details of the configuration and operations that have been described already in conjunction with FIGS. 1 and 2 will be omitted.

FIG. 14 is a flowchart showing a key generation flow in a quantum key generation scheme according to the fifth embodiment of the present invention. As described already, when the receiver detects data through single-photon reception (step S51), the receiver stores the detected data as a raw key in the memory 205 (step S52). Subsequently, the key generation controller 203 reads the raw key stored in the memory 205 one part after another at given lengths from the start (step S53).

The receiver sends the sender, through the classical channel, received-bit numbers assigned to the bits of a partial bit string read out of the raw key and basis information used when receiving these bits. Among random numbers that the sender sent, the key generation controller 103 of the sender selects those bits that were able to be received by the receiver, based on the received-bit numbers received from the receiver (step S54). Further, the key generation controller 103 compares the received basis information corresponding to the received bits on the receiver side, with basis information that the sender has stored. Among the random numbers, the key generation controller 103 keeps only those bits corresponding to matched bases and sends bit numbers assigned to these remaining effective bits to the receiver through the classical channel. Among the received bits stored, the receiver selects only those bits corresponding to the received effective-bit numbers (step S55). In this way, a sifted key (partial sifted key), made from the partial bit string read in the step S53, is provisionally shared between the sender and the receiver (step S56).

Subsequently, part of the receiver's version of the provisionally shared partial sifted key is compared with the corresponding part of the senders' version, and a bit error rate QBER is calculated (step S57). The calculated bit error rate QBER is compared with a threshold value $QBER_{sync}$ for the determination of bit position synchronization establishment (step S58). When $QBER \geq QBER_{sync}$, it is determined that bit position synchronization is not established. Therefore, the bit numbers assigned to the bits that were able to be received by the receiver are shifted by one bit (step S59), and the process returns to the received-bit comparison step S54 again. The step S59 and the steps S54 through S57 are repeated until the bit error rate QBER becomes smaller than the threshold value $QBER_{sync}$.

When $QBER < QBER_{sync}$ (YES in step S58), it is determined that bit position synchronization is established, and the process goes to an eavesdropping determination step S60. The key generation controller 103 of the sender compares the calculated error rate QBER with an error rate threshold value $QBER_{eve}$ for eavesdropping determination, which is used for determining whether or not an eavesdropper is present (step S60). When $QBER < QBER_{eve}$ (YES in step S60), it is determined that no eavesdropper is present, and the partial sifted key at this time is settled and stored.

Subsequently, it is determined whether or not all the parts of the raw key are subjected to comparison (step S61). Sequentially reading partial bit strings from the raw key (step S53), the above-described steps S54 through S60 are repeated until all the parts of the raw key have been subjected to comparison (YES in step S61). Upon the completion of comparison for all the parts of the raw key (YES in step S61), the settled partial sifted keys are concatenated in due order, thus constructing a single cryptographic key (step S62). Thereafter, error correction and privacy amplification are carried out as described earlier (step S63), and the cryptographic key is ultimately shared between the sender and the receiver.

As described above, even in the case where the out-of-synchronization states of a raw key generated on the receiver side by single-photon transmission vary, each partial sifted key can be regenerated from the raw key generated by single-photon transmission, by the reassignment of the bit numbers.

Accordingly, it is possible to achieve a secure, stable, fast key generation rate.

The present invention is applicable not only to the above-described BB84 and B92 schemes, but also to all the key sharing schemes used in quantum cryptographic communications. Moreover, the present invention is applicable not only to the two-way systems in the plug and play scheme as described above, but also to one-way quantum key distribution systems. Furthermore, the application of the present invention is not limited to the quantum key distribution. The present invention can be applied to quantum communications in general and to other communication systems in general in which channels of different optical powers are multiplexed.

Further, the quantum and classical channels may be implemented not only in wavelength division multiplexing communication on a single transmission line but also in time division multiplexing communication. The classical channel may be implemented on a different path by using 10Base-T and the like. As stated above, the technology of the present invention is effective regardless of the scheme of key sharing and the type of quantum communication and classical communication, and the above-described embodiments are not intended to limit the present invention.

Additionally, the present invention is applicable not only to optical communications including quantum communications, but also to any communication systems that perform communication through channels with different reliabilities.

The invention claimed is:

1. A method for generating shared information between a first communication device and a second communication device, which are connected by at least a first channel of relatively low reliability and a second channel of relatively high reliability, comprising:
   a) sending original information from the first communication device to the second communication device through the first channel, wherein the original information comprises a string of bits whose bit positions are relatively determined;
   b) setting reference bit positions to be used for generating shared information between the first communication device and the second communication device through the second channel, to generate provisionally shared information based on information received from the first communication device through the first channel;
   c) determining whether synchronization is established based on the setting of the reference bit positions, by comparing part of a first version of the provisionally shared information on the first communication device with corresponding part of a second version of the provisionally shared information on the second communication device through the second channel;
   d) when said determining step c) determines that synchronization is not established, changing the setting of the reference bit positions to regenerate provisionally shared information in said reference bit positions setting step b); and
   e) when said determining step c) determines that synchronization is established, generating the shared information based on present provisionally shared information.

2. The method according to claim 1, wherein said determining step c) comprises the sub-steps of:
   calculating an error rate using the parts of the first and second versions;
   when the error rate is not smaller than a predetermined threshold value, determining that synchronization is not established; and
   when the error rate is smaller than the predetermined threshold value, determining that synchronization is established.

3. The method according to claim 2, wherein the predetermined threshold value is set to an error value falling into a range where an amount of leaked information is greater than an amount of mutual information sent and received between the first communication device and the second communication device.

4. The method according to claim 2, wherein the error rate is calculated using a predetermined number of bits randomly selected from the provisionally shared information.

5. The method according to claim 1, wherein the setting of the reference bit positions is changed by shifting the reference bit positions by at least one bit.

6. The method according to claim 1, wherein the generating step e) comprises the sub-steps of:
   i) when synchronization is established, further determining whether an eavesdropper is present; and
   ii) when no eavesdropper is present, generating the shared information based on present provisionally shared information.

7. The method according to claim 6, wherein said sub-step i) of determining the presence of an eavesdropper comprises:
   calculating an error rate using the parts of the first and second versions;
   when the error rate is not smaller than a predetermined eavesdropping-check threshold value, determining that an eavesdropper is present; and
   when the error rate is smaller than the predetermined eavesdropping-check threshold value, determining that no eavesdropper is present.

8. The method according to claim 2, wherein said generating step e) further comprises the sub-steps of:
   when the error rate is not smaller than a predetermined eavesdropping-check threshold value, determining that an eavesdropper is present;
   when the error rate is smaller than the predetermined eavesdropping-check threshold value, determining that no eavesdropper is present; and
   when no eavesdropper is present, generating the shared information based on present provisionally shared information.

9. The method according to claim 7, wherein the predetermined eavesdropping-check threshold value is set to an error value falling into a range where an amount of shared information sent and received between the first communication device and the second communication device is greater than an amount of eavesdropped information.

10. The method according to claim 8, wherein the predetermined eavesdropping-check threshold value is set to an error value falling into a range where an amount of shared information sent and received between the first communication device and the second communication device is greater than an amount of eavesdropped information.

11. A method for generating shared information between a first communication device and a second communication device, which are connected by at least a first channel of relatively low reliability and a second channel of relatively high reliability, comprising:
   a) sending original information from the first communication device to the second communication device through the first channel, wherein the original information comprises a string of bits whose bit positions are relatively determined;

b) sequentially reading information received from the first communication device through the first channel at predetermined lengths;
c) setting reference bit positions to be used for generating partial shared information between the first communication device and the second communication device through the second channel, to generate partial provisionally shared information based on partial information of the predetermined length;
d) determining whether synchronization is established based on the setting of the reference bit positions, by comparing part of a first version of the partial provisionally shared information on the first communication device with corresponding part of a second version of the partial provisionally shared information on the second communication device through the second channel;
e) when it is determined that synchronization is not established, changing the setting of the reference bit positions to regenerate partial provisionally shared information in said reference bit positions setting step c);
f) when it is determined that synchronization is established, generating the partial shared information based on present partial provisionally shared information; and
g) when storing at least one piece of partial shared information related to information generating the shared information based on the information received from the first communication device through the first channel, generating the shared information based on the at least one piece of partial shared information.

12. The method according to claim 1, wherein the first channel is a communication channel of a relatively weak optical power state and the second channel is a communication channel of a relatively strong optical power state.

13. The method according to claim 12, wherein the relatively weak optical power state of the first channel is an optical power that is not higher than one photon per bit.

14. The method according to claim 11, wherein the first channel is a communication channel of a relatively weak optical power state and the second channel is a communication channel of a relatively strong optical power state.

15. The method according to claim 14, wherein the relatively weak optical power state of the first channel is an optical power that is not higher than one photon per bit.

16. A system for generating shared information between a first communication device and a second communication device, which are connected by at least a first channel of relatively low reliability and a second channel of relatively high reliability, wherein
the first communication device comprises:
a first communication section for communicating with the second communication device through the first and second channels;
a first memory for storing original information, a first version of provisionally shared information, and shared information, wherein the original information comprises a string of bits whose bit positions are relatively determined;
a first controller controlling the first communication section and the first memory to generate shared information between the first communication device and the second communication device, and
the second communication device comprises:
a second communication section for communicating with the first communication device through the first and second channels;
a second memory for storing received information, a second version of provisionally shared information, and shared information, wherein the received information is information received from the first communication device through the first channel;
a second controller controlling the second communication section and the second memory to generate shared information between the first communication device and the second communication device,
wherein under cooperation between the first controller and the second controller,
a) sending the original information from the first communication device to the second communication device through the first channel;
b) setting reference bit positions to be used for generating shared information through the second channel, to generate the first and second versions of provisionally shared information based on the received information;
c) determining whether synchronization is established based on the setting of the reference bit positions, by comparing parts of the first and second versions of provisionally shared information through the second channel;
d) when it is determined that synchronization is not established, changing the setting of the reference bit positions to performing said reference bit positions setting step b) with changed setting of the reference bit positions; and
e) when it is determined that synchronization is established, generating the shared information based on present first and second versions of provisionally shared information.

17. The system according to claim 16, wherein the first controller controls such that:
i) the original information is sent to the second communication device through the first channel;
ii) the reference bit positions and corresponding bit data are received from the second communication device through the second channel, wherein the reference bit positions are set based on the received information on the second communication device;
iii) the first version of provisionally shared information is generated from the original information based on setting of the reference bit positions and is stored in the first memory;
iv) effective bit positions of the first version of provisionally shared information are sent back to the second communication device;
v) when receiving part of the second version of provisionally shared information from the second communication device, it is determined whether synchronization is established by comparing the part of the second version of provisionally shared information with corresponding part of the first version of provisionally shared information stored in the first memory;
vi) when it is determined that synchronization is not established, a notification indicating out-of-synchronization is sent to the second communication device;
vii) when receiving changed reference bit positions and corresponding bit data from the second communication device, said steps iii), iv), and v) are performed based on setting of the changed reference bit positions; and
viii) when it is determined that synchronization is established, the shared information is generated based on a present first version of provisionally shared information, and
the second controller controls such that
1) the reference bit positions are set based on the received information to send the reference bit positions and corresponding bit data to the first communication device;

2) when receiving the effective bit positions from the first communication device, the second version of provisionally shared information is generated based on the effective bit positions and stored in the second memory;
3) the part of the second version of provisionally shared information is sent to the first communication device;
4) when receiving the notification indicating out-of-synchronization from the first communication device, the reference bit positions are changed to send the changed reference bit positions and corresponding bit data to the first communication device; and
5) when the notification indicating out-of-synchronization is not received from the first communication device, the shared information is generated based on a present second version of provisionally shared information.

18. The system according to claim 16, wherein the first controller controls such that:
   i) the original information is sent to the second communication device through the first channel;
   ii) the reference bit positions and corresponding bit data are received from the second communication device through the second channel, wherein the reference bit positions are set based on the received information on the second communication device;
   iii) the first version of provisionally shared information is generated from the original information based on setting of the reference bit positions and is stored in the first memory;
   iv) effective bit positions of the first version of provisionally shared information are sent back to the second communication device;
   v) when receiving part of the second version of provisionally shared information from the second communication device, it is determined whether synchronization is established by comparing the part of the second version of provisionally shared information with corresponding part of the first version of provisionally shared information stored in the first memory;
   vi) when it is determined that synchronization is not established, the reference bit positions are changed to perform said steps iii), iv), and v) are performed based on setting of the changed reference bit positions; and
   vii) when it is determined that synchronization is established, the shared information is generated based on a present first version of provisionally shared information, and
   the second controller controls such that
   1) the reference bit positions are set based on the received information to send the reference bit positions and corresponding bit data to the first communication device;
   2) when receiving the effective bit positions from the first communication device, the second version of provisionally shared information is generated based on the effective bit positions and stored in the second memory;
   3) the part of the second version of provisionally shared information is sent to the first communication device; and
   4) when the effective bit positions are not received from the first communication device, the shared information is generated based on a present second version of provisionally shared information.

19. A computer software program, recorded on a computer-readable medium, instructing a first computer on a first communication device and a second computer on a second communication device to generate shared information between the first communication device and the second communication device, which are connected by at least a first channel of relatively low reliability and a second channel of relatively high reliability, the program comprising:
   a) sending the original information from the first communication device to the second communication device through the first channel;
   b) setting reference bit positions to be used for generating shared information through the second channel, to generate the first and second versions of provisionally shared information based on the received information;
   c) determining whether synchronization is established based on the setting of the reference bit positions, by comparing parts of the first and second versions of provisionally shared information through the second channel;
   d) when it is determined that synchronization is not established, changing the setting of the reference bit positions to performing said reference bit positions setting step b) with changed setting of the reference bit positions; and
   e) when it is determined that synchronization is established, generating the shared information based on present first and second versions of provisionally shared information.

20. The program according to claim 19, comprising:
   a first program instructing the first computer on the first communication device; and
   a second program instructing the second computer on the second communication device,
   wherein the first program comprises:
   i) the original information is sent to the second communication device through the first channel;
   ii) the reference bit positions and corresponding bit data are received from the second communication device through the second channel, wherein the reference bit positions are set based on the received information on the second communication device;
   iii) the first version of provisionally shared information is generated from the original information based on setting of the reference bit positions and is stored in the first memory;
   iv) effective bit positions of the first version of provisionally shared information are sent back to the second communication device;
   v) when receiving part of the second version of provisionally shared information from the second communication device, it is determined whether synchronization is established by comparing the part of the second version of provisionally shared information with corresponding part of the first version of provisionally shared information stored in the first memory;
   vi) when it is determined that synchronization is not established, a notification indicating out-of-synchronization is sent to the second communication device;
   vii) when receiving changed reference bit positions and corresponding bit data from the second communication device, said steps iii), iv), and v) are performed based on setting of the changed reference bit positions; and
   viii) when it is determined that synchronization is established, the shared information is generated based on a present first version of provisionally shared information, and
   the second program comprises:
   1) the reference bit positions are set based on the received information to send the reference bit positions and corresponding bit data to the first communication device;

2) when receiving the effective bit positions from the first communication device, the second version of provisionally shared information is generated based on the effective bit positions and stored in the second memory;

3) the part of the second version of provisionally shared information is sent to the first communication device;

4) when receiving the notification indicating out-of-synchronization from the first communication device, the reference bit positions are changed to send the changed reference bit positions and corresponding bit data to the first communication device; and 5) when the notification indicating out-of-synchronization is not received from the first communication device, the shared information is generated based on a present second version of provisionally shared information.

21. The program according to claim 19, comprising:

a first program instructing the first computer on the first communication device; and a second program instructing the second computer on the second communication device, wherein the first program comprises:

i) the original information is sent to the second communication device through the first channel;

ii) the reference bit positions and corresponding bit data are received from the second communication device through the second channel, wherein the reference bit positions are set based on the received information on the second communication device;

iii) the first version of provisionally shared information is generated from the original information based on setting of the reference bit positions and is stored in the first memory;

iv) effective bit positions of the first version of provisionally shared information are sent back to the second communication device;

v) when receiving part of the second version of provisionally shared information from the second communication device, it is determined whether synchronization is established by comparing the part of the second version of provisionally shared information with corresponding part of the first version of provisionally shared information stored in the first memory;

vi) when it is determined that synchronization is not established, the reference bit positions are changed to perform said steps iii), iv), and v) are performed based on setting of the changed reference bit positions; and vii) when it is determined that synchronization is established, the shared information is generated based on a present first version of provisionally shared information, and the second program comprises:

1) the reference bit positions are set based on the received information to send the reference bit positions and corresponding bit data to the first communication device;

2) when receiving the effective bit positions from the first communication device, the second version of provisionally shared information is generated based on the effective bit positions and stored in the second memory;

3) the part of the second version of provisionally shared information is sent to the first communication device; and 4) when the effective bit positions are not received from the first communication device, the shared information is generated based on a present second version of provisionally shared information.

* * * * *

UNITED STATES PATENT AND TRADEMARK OFFICE
CERTIFICATE OF CORRECTION

| | |
|---|---|
| PATENT NO. | : 7,616,765 B2 |
| APPLICATION NO. | : 11/261669 |
| DATED | : November 10, 2009 |
| INVENTOR(S) | : Maeda et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this

Nineteenth Day of October, 2010

David J. Kappos
*Director of the United States Patent and Trademark Office*